No. 867,847. PATENTED OCT. 8, 1907.
W. R. SMITH.
APPARATUS FOR TREATING SKINS.
APPLICATION FILED JUNE 21, 1905.
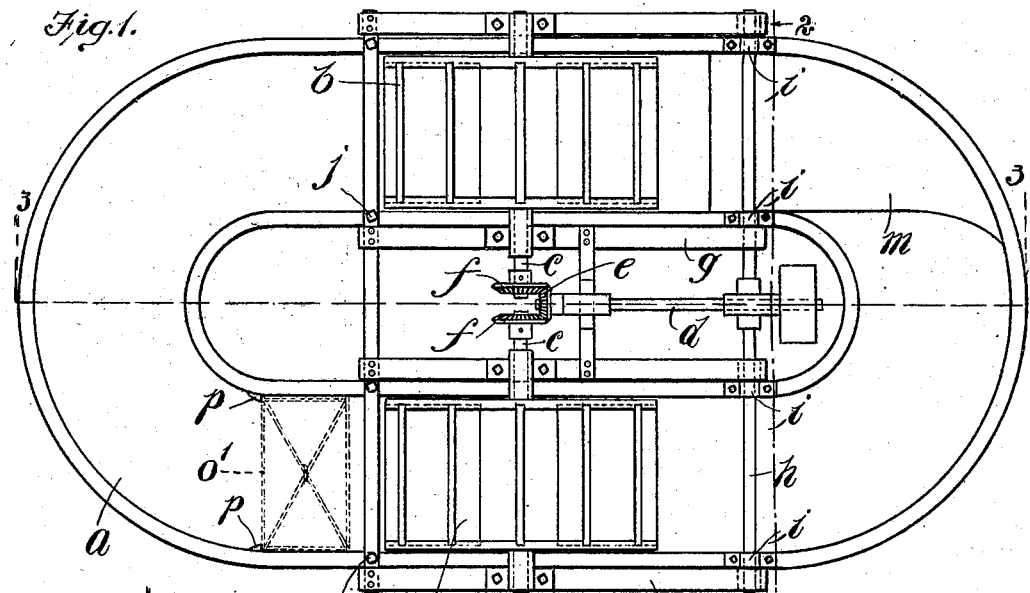
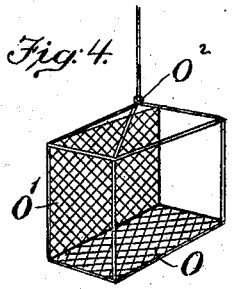
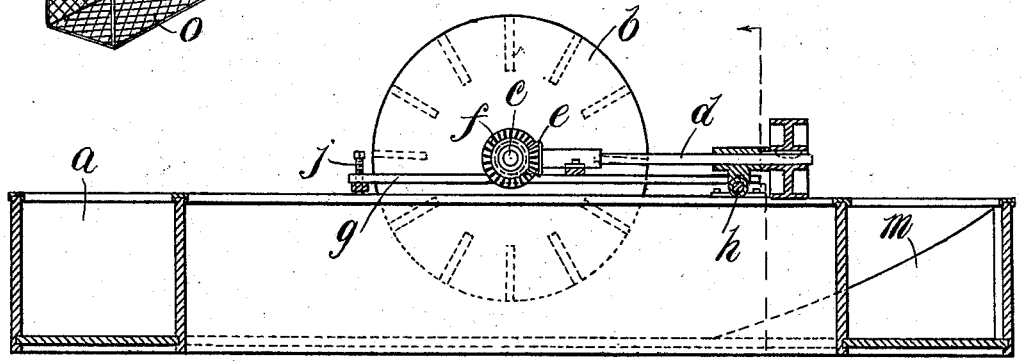
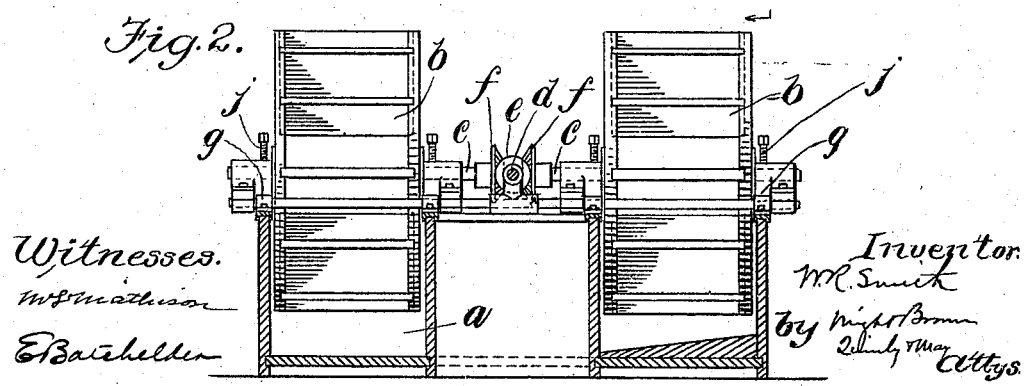

UNITED STATES PATENT OFFICE.

WILLIAM R. SMITH, OF BUFFALO, NEW YORK, ASSIGNOR TO BUFFALO LEATHER CO., OF BUFFALO, NEW YORK, A CORPORATION OF WEST VIRGINIA.

APPARATUS FOR TREATING SKINS.

No. 867,847.  Specification of Letters Patent.  Patented Oct. 8, 1907.

Application filed June 21, 1905. Serial No. 266,266.

*To all whom it may concern:*

Be it known that I, WILLIAM R. SMITH, of Buffalo, in the county of Erie and State of New York, have invented certain new and useful Improvements in Apparatus for Treating Skins, of which the following is a specification.

This invention relates to an improved apparatus for subjecting hides and skins to a liquid, which acts on the skin in various steps of the tanning operation, such as soaking liming, baiting and washing. It is customary in baiting and washing skins to place the skins to be treated in a tank containing a rotary paddle-wheel which agitates the liquid and causes a movement of the liquid and the skins. The paddle-wheel is located above the main body of the tank which in order to have suitable capacity has to be made so deep as to leave room below the paddle-wheel for a considerable accumulation of liquid and skins. Owing to the depth of this accumulation the skins at the bottom portion of the tank are liable to lie undisturbed and in close contact with each other for an indefinite period, so that they are not properly subjected to the action of the liquid, the result being discoloration of the skins and imperfect tannage.

I have found that by employing a relatively shallow endless tank and providing means for moving the contents of the tank horizontally, I am enabled to prevent the skins from clinging together, and to give the liquid free access to all the surfaces of the skins, doing away with the objections above noted.

My invention consists in the improved apparatus hereinafter described and claimed, said apparatus including an endless tank and means such as one or more paddle-wheels for moving the contents of the tank horizontally.

Of the accompanying drawings forming a part of this specification,—Figure 1 represents a top plan view of an apparatus embodying my invention. Fig. 2 represents a section on line 2—2 of Fig. 1. Fig. 3 represents a section on line 3—3 of Fig. 1. Fig. 4 represents a perspective view of the elevating devices detached.

The same reference characters indicate the same parts in all the figures.

In the drawings, $a$ represents an endless tank or raceway which is preferably formed as a flattened ellipse as shown in Fig. 1, although it may be circular or of any other suitable form.

$b$ represents a paddle-wheel affixed to a shaft $c$, which is journaled in bearings above the tank, the lower blades of the wheel entering the liquid in the tank and extending substantially across the tank, so that the rotation of the wheel causes a continuous horizontal movement of the liquid. In practice, I employ two paddle-wheels extending across the two straight stretches of the tank, with their shafts $c\ c$ in alinement. The wheels are rotated simultaneously in opposite directions by suitable means such as a driven shaft $d$ having a bevel gear $e$ meshing with bevel gears $f\ f$ on the shafts of the two paddle-wheels. Each wheel imparts motion to the liquid with which it is in contact, the result being a progressive horizontal flow of the liquid in the endless tank.

A batch of skins placed in a charge of liquid in the tank will be moved horizontally by the liquid and will be kept in a substantially horizontal position by the current, the surfaces of each skin being free from close or clinging contact with the surfaces of the other skins. When the skins come under the paddle-wheels they are raised by the rising paddles to or toward the surface of the liquid and then move on toward the next wheel, sinking somewhat, it may be, in the liquid and being again raised by the paddles of the next wheel. I find that the described apparatus causes the skins to float horizontally independently of each other and therefore treats all the skins uniformly so that there is no discoloration and no variation in the action of the liquid on different skins or on different parts of the same skin.

The paddle-wheels are preferably vertically adjustable, so that they can be raised and lowered according to the depth of the liquid and the number of skins. To this end the shaft of each wheel may be journaled in a frame $g$, having a rod or hinge-member $h$ journaled in fixed bearings or hinge-members $i$. The frame is or may be provided with means such as adjusting screws $j$ for holding the frame and the paddle-wheels at various heights.

I prefer to provide means for turning the skins over at a given point in their course through the tank, so that after they have passed under one paddle-wheel and their upper surfaces have been acted on by the blades of said wheel, the skins will be turned over or inverted, so that the blades of the next wheel will act on the opposite surfaces of the skins. To this end I have here shown a deflector $m$ having a spiral upper surface resembling the outer surface of a plow mold board. This deflector extends across the tank and is inclined upwardly from the bottom of the tank, its lower end being horizontal crosswise of the tank while its transverse section gradually inclines crosswise of the tank to its higher end. The current causes the skins to slide up the inclined surface of the deflector and to roll over sidewise as they approach its higher end, so that when the skins leave the deflector, the sides which before faced upwardly, face downwardly toward the bottom of the tank. It will be observed that the deflector m is located at such a point in the tank relatively to the paddle wheels, the skins will slide freely up the inclined surfaces thereof and drop free over the top edges thereof, under the impulse of the moving liquid alone rather than from any direct action of the wheels upon the skins. If the deflector were to be located close to either of the wheels, the skin moving over the deflector would slide up subject to direct contact by the paddles of the wheels, which would then have a tendency to bunch up the skins without turning them over in spread-out condition. Means may be provided for withdrawing the skins from the tank after they have been sufficiently treated. The means here shown comprise a basket consisting of a bottom o and a back o' both of grated or openwork construction. The said basket is provided with a frame or bail $o^2$ whereby it may be suspended from an overhead drum adapted to be rotated to raise and lower the basket. The sides of the tank are provided with vertical guides p p, which engage the vertical ends of the back and hold it against the force of the current. When the basket is lowered into the tank the back o' forms a gate which arrests the skins over the bottom o, the liquid passing on through the back. The elevation of the basket causes its bottom to raise from the liquid the skins arrested by the back o', the skins being removed in any suitable way from the elevated basket.

The body of water in the tank or raceway may carry chemicals suited to the operation in progress. When the skins are being limed the water may carry arsenic and lime. When the skins are being baited the water may carry sulfuric acid.

When the skins are being soaked water alone is used, this being changed from time to time.

The time required to perform either of the above-mentioned operations is materially decreased by my improved method and apparatus, and at the same time improved results are produced.

I claim:

1. An apparatus of the character stated comprising an endless tank, means for moving the contents of the tank horizontally, said tank being free from obstructions to the passage of the liquid and skins flotatively carried thereby, whereby such skins may float horizontally and independently of each other, and means for turning or inverting the skins, said means being located sufficiently remote from the means for moving the contents of the tank to prevent simultaneous direct action of the impelling means and the turning means upon the skins.

2. An apparatus of the character stated comprising an endless tank, means for moving the contents of the tank horizontally, said tank being free from obstructions to the passage of the liquid and skins flotatively carried thereby, whereby such skins may float horizontally and independently of each other, and a deflector adapted to turn or invert the skins, said deflector being located sufficiently remote from the means for moving the contents of the tank to prevent simultaneous direct action of the impelling means and the deflector upon the skins.

3. An apparatus of the character stated comprising an endless tank, rotary paddle-wheels therein, means for rotating said wheels simultaneously in opposite directions, and a deflector between the wheels adapted to turn or invert the skins, said deflector being located sufficiently remote from the paddle wheels to prevent simultaneous direct action of the deflector and paddle wheels upon the skins.

4. An apparatus of the character stated comprising an endless tank, means for moving the contents of the tank horizontally, and means for arresting and elevating skins carried by the current of liquid.

5. An apparatus of the character stated comprising an endless tank, means for moving the contents of the tank horizontally, a basket having a bottom and an open or grated back adapted to form a gate across the tank, and means for raising and lowering the basket.

In testimony whereof I have affixed my signature, in presence of two witnesses.

WILLIAM R. SMITH.

Witnesses:
WILLIAM R. HEATH.
FRANCIS A. RANSOM.